(12) United States Patent
Roth

(10) Patent No.: US 10,259,662 B2
(45) Date of Patent: Apr. 16, 2019

(54) DEVICE AND METHOD FOR THE RELIABLE DELIVERY OF SHAPED STOPPER ELEMENTS

(71) Applicant: GEBO PACKAGING SOLUTIONS FRANCE, Reichstett (FR)

(72) Inventor: Emmanuel Roth, Mundolsheim (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 0 days.

(21) Appl. No.: 15/540,902

(22) PCT Filed: Dec. 30, 2014

(86) PCT No.: PCT/EP2014/079482
§ 371 (c)(1),
(2) Date: Jun. 29, 2017

(87) PCT Pub. No.: WO2016/107656
PCT Pub. Date: Jul. 7, 2016

(65) Prior Publication Data
US 2017/0362038 A1    Dec. 21, 2017

(51) Int. Cl.
*B65G 47/14*    (2006.01)
*B65G 47/256*    (2006.01)

(52) U.S. Cl.
CPC ....... *B65G 47/256* (2013.01); *B65G 47/1471* (2013.01); *B65G 2201/0235* (2013.01); *B65G 2203/0225* (2013.01)

(58) Field of Classification Search
CPC .................................................... B65G 47/256

USPC .......... 198/377.01, 382, 383, 393, 395, 401, 198/406; 209/530, 540, 544
See application file for complete search history.

(56) References Cited

U.S. PATENT DOCUMENTS

| | | | | |
|---|---|---|---|---|
| 3,768,626 A | * | 10/1973 | Vossler | B65G 35/00 198/396 |
| 3,804,240 A | | 4/1974 | Wahlert | |
| 3,874,740 A | | 4/1975 | Hurd | |
| 3,924,732 A | * | 12/1975 | Leonard | B65G 47/1471 198/397.06 |

(Continued)

FOREIGN PATENT DOCUMENTS

DE   100 61 063 A1   4/2002
DE   10 2005 043 230 A1   3/2007

(Continued)

OTHER PUBLICATIONS

US 2018/0127219 A1, Wagner et al. May 10, 2018.*

(Continued)

*Primary Examiner* — Douglas A Hess
(74) *Attorney, Agent, or Firm* — Young & Thompson

(57) ABSTRACT

Disclosed is a device for delivering sorted elements of the cap, stopper or other type, in order to feed a downstream work station, the device including a unit for lifting elements, in which a first sorting operation is performed, and, mounted downstream, a unit for treating the elements in which the elements are treated individually. Also disclosed is a delivery device including a conveyor mounted downstream from the treatment unit in order to direct the elements towards the work station, the conveyor moving the elements singly. Further disclosed is a corresponding method.

18 Claims, 5 Drawing Sheets

(56) References Cited

U.S. PATENT DOCUMENTS

| | | | | |
|---|---|---|---|---|
| 4,596,107 | A * | 6/1986 | Pfleger, Sr. | B07C 5/3408 198/370.03 |
| 4,735,343 | A * | 4/1988 | Herzog | B65G 47/256 198/393 |
| 5,394,972 | A | 3/1995 | Aidlin et al. | |
| 5,586,637 | A | 12/1996 | Aidlin et al. | |
| 5,680,922 | A * | 10/1997 | Bessels | B65G 21/2018 198/396 |
| 8,276,741 | B1 * | 10/2012 | Zittel | B65G 15/58 198/380 |
| 8,376,119 | B2 * | 2/2013 | Yohe | B29C 49/4273 198/395 |
| 8,967,365 | B2 * | 3/2015 | Sirkett | B65G 47/19 198/396 |
| 9,096,390 | B2 * | 8/2015 | Ackley | B07C 5/00 |
| 9,187,254 | B2 * | 11/2015 | Beyer | B07C 5/02 |
| 2013/0098812 | A1 | 4/2013 | Lopez | |
| 2015/0136570 | A1 | 5/2015 | Stelzer et al. | |

FOREIGN PATENT DOCUMENTS

| | | |
|---|---|---|
| DE | 10 2008 057 902 A1 | 5/2010 |
| DE | 10 2012 006 150 A1 | 10/2013 |
| EP | 0599228 A2 | 6/1994 |
| EP | 1 652 801 A1 | 5/2006 |
| EP | 2 588 395 A2 | 5/2013 |
| WO | 98/47790 A1 | 10/1998 |
| WO | 2006/045927 A1 | 5/2006 |

OTHER PUBLICATIONS

US 2018/0148272 A1, Wagner et al. May 31, 2018.*
International Search Report, dated Sep. 16, 2015, from corresponding PCT application No. PCT/EP2014/079482.

* cited by examiner

DEVICE AND METHOD FOR THE RELIABLE DELIVERY OF SHAPED STOPPER ELEMENTS

This invention relates to the field of the delivery of stopper elements for containers of liquid, such as bottles, flasks, or the like, and it has as its object, on the one hand, a method that makes it possible to convey in a selective way shaped elements and, on the other hand, a device that uses this method.

In the field of the invention, the delivery of stopper elements is necessary upstream from a machine that has as its essential function to fill the container and to close it.

The delivery of a stopper element is done preferably with a first sorting device as described in, for example, WO2006/045927 and that comprises a hopper, into which a large quantity of stopper elements can be poured in bulk, as well as a lifting belt, circulating upward from the hopper to sample elements therein and to bring them into the area of an upper exit zone. The belt generally has transverse strips on which rest the stopper elements during their upward conveying.

During the circulation on the belt between the hopper, feed zone, and the exit zone, the poorly-oriented elements are ejected, preferably simply by making them fall from the belt to the hopper owing to gravity, as is described in, for example, U.S. Pat. Nos. 5,394,972 or 5,586,637. This thus generally makes it possible to ensure that the stopper elements delivered by this first sorting device all have their bottoms right side up.

When the stopper elements have arrived opposite the exit zone, they are detached from the belt by a suitable device. Leaving such a first sorting device, it is therefore not possible to ensure that the stopper elements are correctly positioned in rotation around the axis of their threading or axis of radial symmetry. In certain applications whose stopper elements have a more complex shape than simple cylinders, see FIGS. 4B and 4C, it is necessary, however, to deliver correctly-oriented caps to the sealing device, i.e., not only with their bottoms on the same side, but also with a predefined angular position.

In addition, taking into account the intolerance downstream for operational mistakes, even rare ones, on the part of such a first sorting device, it is still useful to process any elements that might still be non-compliant upon exit.

Thus, for example, EP2588395 discloses a downstream sorting wheel that detaches poorly-positioned caps using a retractable pin principle and that can, depending on its orientation, hook the cap and guide it or not. It is also possible to use such a wheel to distinguish the caps based on the possible absence of a collar. The conveying of this wheel downstream is done with two bands that entrain the stopper elements without referencing them and that therefore convey them loosely.

For its part, U.S. Pat. No. 3,874,740 has a device that makes it possible to return caps that would also still be poorly-oriented. This principle quite obviously cannot be used on loose caps, but only for processing possible mistakes that remain despite an upstream sorting operation. This operation, however, cannot be generalized to any type of stopper element and cannot work at high speed. It is also usable only for rotating a stopper element perpendicularly to its axis of symmetry.

It is therefore necessary to propose a solution that makes it possible, and this even at high speed, to detect, downstream from an orientation device, stopper elements that would be non-compliant, in particular in terms of orientation, or that would have intrinsic manufacturing mistakes and would eliminate them. The need for eliminating a non-compliant product should not, however, lead to the elimination of an excessive number of products, which can have obvious impacts on the overall yield.

In addition, it is advantageous to be able to coordinate the flow rate of the machine using these stopper elements with the output flow rate of such a delivery device.

To do this, the invention proposes conveying the stopper elements in a controlled way to the unit by controlling the position of each of them, downstream from the processing means in which they are at least referenced, which then makes it possible in particular, downstream, to know the flow rate with precision, as well as the position of each stopper element, and therefore, if necessary, to take action on them specifically.

The invention thus has as its object a device for delivering sorted elements, such as caps, stoppers, or the like, to feed a downstream work station, with said device comprising a means for lifting elements in which a first sorting operation is performed, as well as, mounted downstream, a means for the processing of elements, for processing said elements individually.

This device is characterized in that it comprises a conveyor, mounted downstream from the processing means for directing the elements toward the work station, with said conveyor moving the referenced elements one at a time.

The invention also has as its object a method that uses such a device, namely a method for delivery of stopper elements of a container for liquid of the bottle type or the like, to feed a downstream work station, comprising a series of steps consisting essentially in carrying out a first selection of elements within a lifting means, bringing the elements to a processing means 4 in a single-line column, processing the elements one at a time within the processing means, with this method being characterized in that it also comprises, following the processing one at a time, an output conveying step toward the downstream work station, during which each element is entrained separately, by therefore controlling the position of each element.

The invention will be better understood owing to the description below, which is based on possible embodiments, explained in a way that is illustrative and not at all limiting, with reference to the accompanying figures, in which.

Figure 1:
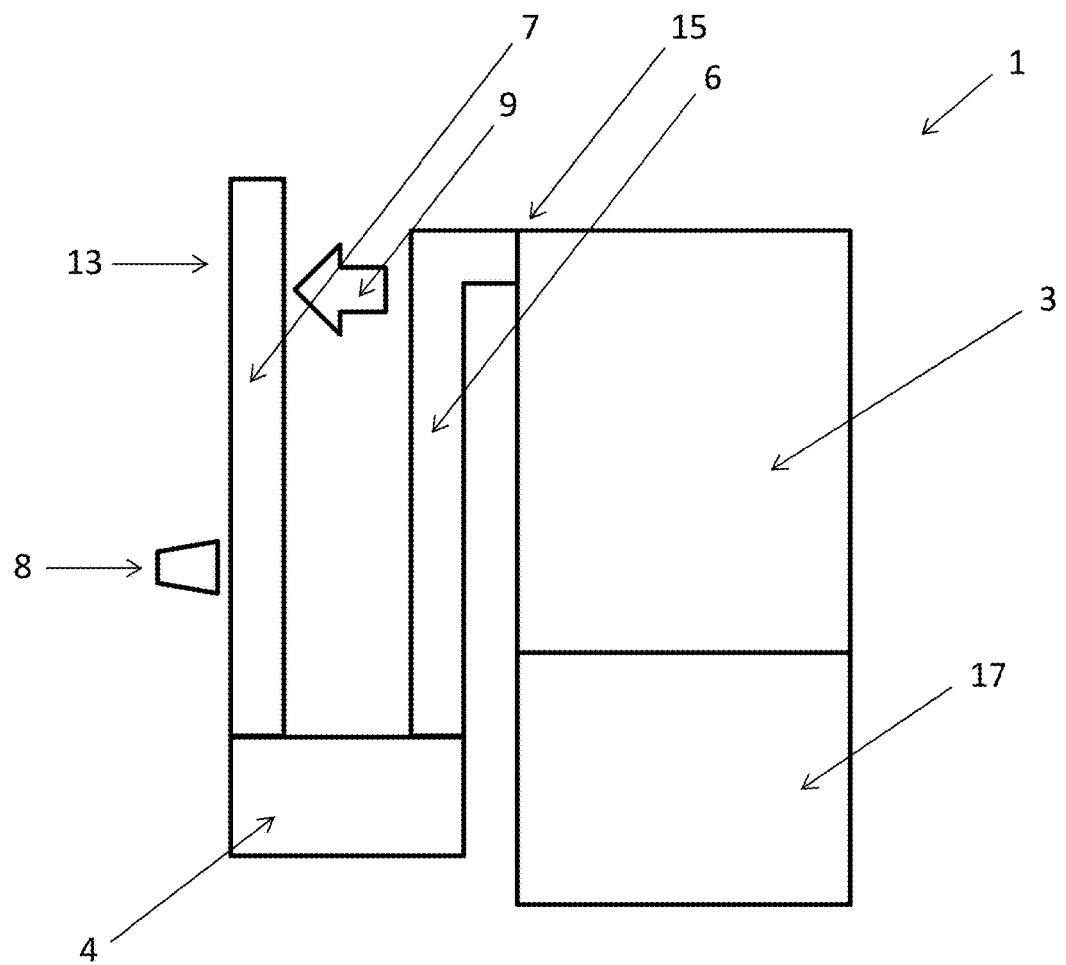
FIG. 1 is an overall view of an embodiment of the invention.

The invention thus first has as its object a device 1 for delivery of sorted elements 2, such as caps, stoppers, or the like, for feeding a downstream work station, with said device comprising a means 3 for lifting elements 2 in which a first sorting operation is performed, as well as, mounted downstream, a means 4 for processing elements 2, for processing said elements 2 individually. The first function of this delivery device 1 is therefore to feed a work station, of the sealing-device filler type, with closing elements 2, such as caps, stoppers, or the like. This delivery device 1 is to bring them into a predefined position, and therefore carries out an operation for selection of only the elements 2 that are well-positioned or structurally compliant, or else itself ensures the changing of the elements 2 in orientation when necessary.

The lifting means 3 comprises a belt equipped with transverse strips, on which the elements 2 can be positioned. The poorly-oriented elements 2 drop into the hopper 17.

In the upper part of the lifting means 3, the delivery device 1 has an exit zone 15, through which pass the elements 2 that were retained. They then pass through a discharge chute 6, which is essentially oriented downward, into which the elements 2 fall by gravity. The discharge chute 6 empties directly into the upper part of the processing means 4, which then grasps each element 2 individually, with a flow rate that depends on its operating speed. The elements 2 are therefore fed into the discharge chute 6 by the lifting means 3 and are removed therefrom individually by the processing means 4. An accumulation of elements 2 is thus possible within the discharge chute 6, which makes it possible to ensure a constant supply with processing means 4 using a suitable regulation.

The processing means 4 processes each element 2 separately and individually, while upstream, they are freely loose, against one another within a single-line column that extends vertically within the discharge chute 6. The processing means 4 thus makes it possible to bring about referencing of the elements 2 individually, with their positions being unknown precisely up until then, element 2 by element 2. The processing means 4 can ensure an orientation of the elements 2, and even an ejection of the non-compliant elements 2. The processing means 4 makes it possible at least to grasp each element 2 separately and to deliver them to the conveyor 5 just afterward, which makes it possible to have a processing means 4 whose design prevents jamming, whereas the conveyor 5 has a design dedicated to the movement of the elements 2. Being located at the bottom of a discharge chute 15, the processing means 4 is easily accessible for an intervention in the event of a problem. Preferably, the exit zone 15 is also at a height that is accessible to an operator on the ground.

According to the invention, the delivery device 1 comprises a conveyor 5, mounted downstream from the processing means 4 for directing the elements 2 toward the work station, said conveyor 5 moving the elements 2 that are referenced singly, in such a way as to be able to know the position of each of them separately, and even to act separately on each of them. The position of the conveyor 5 is known continuously, which consequently makes it possible to know the position of each element 2 at any moment, since the conveyor 5 manipulates each element 2 separately without sliding. Within the upward chute 7 where the conveyor 5 moves, the elements 2 are therefore referenced individually, and unlike the discharge chute 6, the position of each element 2 is therefore known and controlled.

Preferably, the conveyor 5 takes the form of a continuous belt equipped with stops 16 for entraining elements 2, each stop 16 being intended to entrain a single element 2. The position of the conveyor 5 is preferably known precisely at each moment, in such a way as to be able to know with precision the position of an element 2 that was to have been picked up. This can be achieved, for example, by resorting to a motor for driving the conveyor 5 whose angular position is known precisely at each moment.

The conveyor 5 therefore has the advantage of acting mechanically separately on each element 2 by a stop principle, each element 2 being conveyed without sliding in the area of a suitable housing, to know the position of the conveyor 5 making it possible to know immediately the longitudinal position and the movement of each element 2 that is picked up.

In addition, the position of the elements 2 within the processing means 4 is optionally also known using feedback as to the exact position of the processing means 4, which, as will be described below, can take the form of a driving wheel 11 whose angular position is always known.

Thus, according to a possible additional characteristic, the delivery device 1 comprises a discharge chute 6, between the exit of the lifting means 3 and the processing means 4, in which the elements 2 fall by gravity and can accumulate loosely, preferably in a single column.

According to a possible additional characteristic, the delivery device 1 also comprises an upward chute 7, placed after the processing means 4, and in which the conveyor 5 circulates. The elements 2 carry out, in the upward chute 7, under the action of the conveyor 5 on each element 2 separately, the movement that is inverse to that which they undergo in advance in the discharge chute 6, where they move in an ungoverned manner downward to the single-line processing means 4.

The elements 2 are guided into the discharge chute 6 as well as into the upward chute 7 owing to a kind of hollow channel that is more or less recessed in which they can circulate.

As FIG. 1 shows, the delivery device 1 thus has a structure where the processing means 4 is in the lower part of a U-shaped conveying path. The bulk of the discharge chute 6 as well as the upward chute 7 is also accessible for an operator.

In particular embodiments, the processing means 4 grasps each element 2 separately to bring them to the conveyor 5 and optionally ensures, in addition, an orientation function of poorly-oriented elements 2, and even the ejection of non-compliant elements 2. The processing means 4 acts mechanically on each element 2 separately to move it in the referenced way. The processing means 4 therefore grasps one after the other of the elements 2, by therefore acting each time on the lowest element 2 in the column that they form above the processing means 4. This maneuver makes it possible at least to reference each element 2. It may also be useful to carry out a change in orientation of the element 2 during its movement under the action of the processing means 4 of the discharge chute 6 to the upward chute 7. Such a change in orientation is thus complementary to the selection that can be made in the lifting means 3, since it makes it possible to modify the orientation according to a criterion to which the lifting means 3 is not sensitive.

The delivery device 1 therefore has the series of a discharge chute 6, in which the elements 2 move freely, a processing means 4, within which they are at least manipulated and moved, each separately, and then a conveyor 5 moving each element 2 separately and moving upward within an upward chute 7.

According to a possible additional characteristic, the delivery device 1 also comprises, on the one hand, a visual analysis means 8 for monitoring the appearance of elements 2 while they are transported by the conveyor 5 downstream from the processing means 4, and, on the other hand, at least one ejection means 9, acting downstream from the visual analysis means 8, for detaching the elements 2 that are detected as being non-compliant on the basis of the visual analysis. This visual analysis therefore verifies the final compliance of the elements 2 provided to the downstream work station by the delivery device 1, in terms of position, orientation, and/or intrinsic characteristics.

The ejection means 9 preferably acts while the elements are transported without the possibility of relative movement by the conveyor 5, since they are each referenced there separately and moved in a controlled manner. It is thus possible to know exactly where an element 2 that was previously detected by the visual analysis means 8 as being unsatisfactory and on which the ejection means 9 must act is found later.

In preferred embodiments, the ejection means 9 takes the form of a guide stop that modifies the path of the element 2 or that entrains the element 2, or else a compressed-air-jet nozzle, or else a form of pusher.

According to another possible additional characteristic, the delivery device 1 also comprises a monitoring unit, receiving the signal from the visual analysis means 9 as well as a signal that represents the advance of the conveyor 5 and that controls the maneuvering of at least one ejection means 9 in such a way as to use the ejection means 9 in the case of detection of a mistake in the area of the visual analysis means 8, and this in a synchronized manner with the movement of the conveyor 5 to detach from said conveyor 5 the least possible number of satisfactory elements 2 by mistake.

In advantageous embodiments, the processing means 4 comprises a driving transfer wheel 11, which individually entrains the elements 2 on its periphery, or area of openings 18. The discharge chute 6 therefore empties through its lower zone in the area of the periphery of the transfer wheel 11, from the side where its movement goes downward, i.e., in the same direction as the elements 2 in the discharge chute 6. The conveyor 5 and the processing means 4 can optionally be formed by the same driving means. In the illustrated embodiments, the processing means 4 drives the movement of the elements 2 and is therefore a motor. It should actually be noted that it could be harmful to have to arrange a column of elements 2 in the discharge chute 6 that is high enough so that the pressure that is obtained is sufficient to move the processing means 4 and subsequently the other elements 2 that it contains. The processing means 4 in the form of a motorized transfer wheel 11 thus ensures the controlled movement of the elements 2 from the discharge chute 6 to the upward chute 7. Its speed therefore conditions the speed at which the elements 2 are taken from the discharge chute 6. Of course, the speed of the transfer wheel 11 is coordinated with that of the conveyor 5 so that the same time elapses between two elements 2 that are moved via the conveyor 5 and two elements 2 that are moved by the transfer wheel 11. This prevents the collisions and the breakage of parts.

Thus, preferably, the conveyor 5 and the transfer wheel 11 work in a synchronized manner to make it possible for each element 2 separately to pass from the transfer wheel 11 to the conveyor 5. As illustrated below, the transfer wheel 11 has peripheral openings 18 that are each dedicated to the receiving of an element 2, with the conveyor 5 having in particular successive support pins 16, each dedicated to a single element 2 and forming a referencing means one at a time with the processing means 4. The transfer wheel 11 and the conveyor 5 are then synchronized in such a way that an element 2 passes each time from an opening 18 to a pin 16, without running the risk of collision between the conveyor 5 and the transfer wheel 11.

The visual analysis means 8 makes it possible to carry out a test based on the geometry that is observed for the elements 2. In the case of non-compliance at the output of the processing means 4, which, as a complement to the lifting means 3, can ensure one selective conveying function at a time, it is therefore necessary to provide an ejection of non-compliant elements 2.

The ejection means 9 is therefore found in the area of the discharge passage 14 and acts on the elements 2 to be removed to push them into this passage 14. Resorting to such a passage 14, which forms a non-guided part in the section 13, requires, of course, preventing compliant elements 2 from being able to circulate there, and it is therefore necessary to provide a referencing means, ensuring that the elements 2 will not naturally go toward this passage 14 but that a controlled force is implemented to eject identified elements 2 deliberately.

Thus, according to a possible additional characteristic, the delivery device 1 comprises a referencing means that ensures the placement of elements 2 against a reference surface 12 during their conveying by the conveyor 5 within a predefined section 13 of the delivery device 1, with said section 13 having an open part without guiding forming a passage 14 opposite the reference surface 12, with the ejection means 9 acting in such a way as to direct the elements 2 toward this open part to detach them from the conveyor 5.

In certain possible embodiments, the referencing means essentially consists of a channel 10 for guiding elements 2 that is twisted in such a way as to ensure that, under the effect of gravity, each element 2 is flattened and circulates against a bottom of said channel 10 that then forms the reference surface 12. The distribution of the masses of the element 2 is therefore used here to bring about referencing, see FIG. 3. The axis around which the channel is twisted therefore has a horizontal component.

Figure 5:
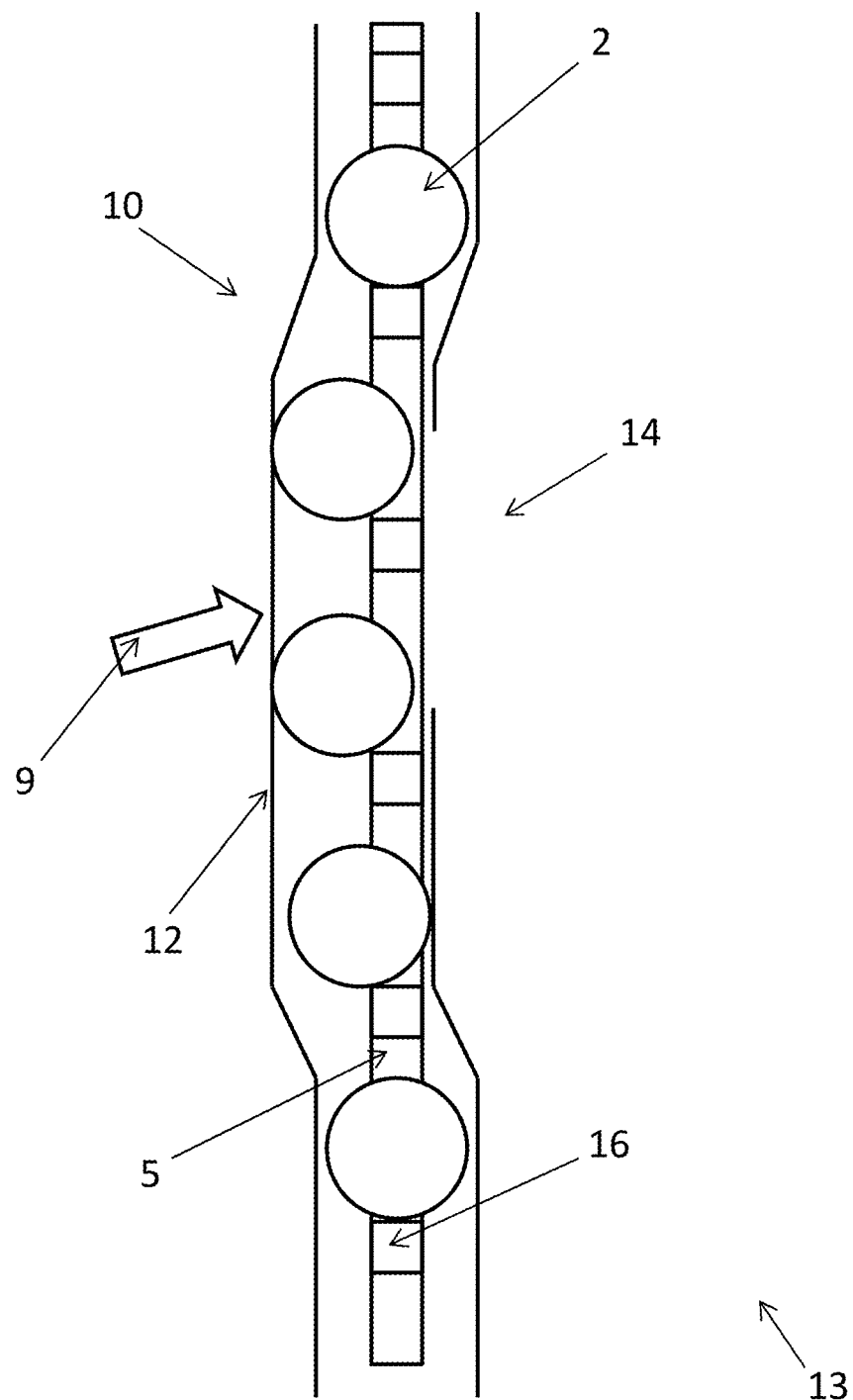
FIG. 5 shows a possible embodiment of a referencing unit for ejection.

In other embodiments, see FIG. 5, the referencing means essentially consists in a channel 10 for guiding elements 2 that is offset in relation to the direction of the conveyor 5, in such a way that the conveyor 5 exerts on the element 2 a force that does not pass through its center of gravity and that thus has the effect of pushing it laterally toward one of the side surfaces of said channel 10 that then forms the reference surface 12. The channel 10, advantageously approximately vertical, therefore pushes the element 2 so that the action of the pin 16 of the conveyor 5 no longer passes through its center of gravity, with the action of the conveyor 5 creating a torque that brings the element 2 against one of the guide surfaces of the channel 10, which then makes possible the elimination of the opposite surface.

The at least one ejection means 9 of the delivery device 1 then optionally comprises forms a retractable guide in a controlled way that will have the effect of guiding the elements 2 toward the exit passage 14, under the action of the entraining of the conveyor 5. It is also conceivable to resort to a puff of air or even to a pusher that moves so that its movement entrains the element 2 to be brought into the passage 14.

The invention also has as its object a method for delivery of stopper elements 2 of a container for liquid of the bottle type or the like, to feed a downstream work station, comprising a series of steps essentially consisting in carrying out a first selection of elements 2 within a lifting means 3, bringing the elements 2 in a single-line column toward a processing means 4, processing the elements 2 one at a time within the processing means 4, in particular so as to reference them in position, orient them, and/or eject the non-compliant elements 2 one at a time. This method is implemented by a delivery device 1 as described above. In absolute terms, it is conceivable that the elements 2 be brought toward the processing means 4 in a referenced way one at a time by a suitable means. Preferably, bringing the elements 2 into a single-line column is done by allowing gravity to act, with the elements 2 circulating within a discharge chute 6 that ends on a means 4 for processing elements 2 one at a time, and within which they accumulate.

According to the invention, this method also comprises, following processing one at a time, an output conveying step toward the downstream work station, during which each element 2 is entrained separately. It is thus possible to carry out targeted operations on each element 2 that exits from the delivery device 1 and that therefore has undergone the operations above. In addition, it is possible to coordinate the output flow rate of the delivery device 1 with the operating flow rate of the machine to be fed. Of course, during this output conveying, as well as during the processing one at a time, multiple elements 2 can be manipulated simultaneously, which means that the operation on an element 2 can begin before the end of the operation on the preceding one.

According to a possible additional characteristic, the method also comprises
    carrying out the monitoring of the appearance of each element 2 during the output conveying, in particular using a stationary camera in the field of view from which the elements 2 circulate, and
    automatically detaching the elements 2 that are detected as non-compliant on the basis of the monitoring of appearance.

Detaching the non-compliant detected elements 2 in the upward chute 7 is done in particular, on the one hand, by ensuring the position of the element 2 against a reference surface 12 within a section 13 that has a passage 14, and, on the other hand, by directing the elements 2 toward said passage 14, in particular under the action of a guide stop, a stream of air, or another mechanical action.

In particular embodiments, carrying out a monitoring of appearance comprises verifying the position of the element 2 in such a way as to be able to detect a poor orientation and/or verifying its dimensions, in such a way as to be able to detect the absence of a collar, for example, and/or verifying that the element 2 is complete, in such a way as to be able to detect material gaps within the element 2, for example.

Finally, according to another possible additional characteristic, processing the elements 2 one at a time essentially consists in grasping each one of them separately from the discharge chute 6 to bring them into the upward chute 7, and/or to modify the orientation thereof, and/or to detach the non-compliant elements 2. This therefore makes it possible at least to ensure a first referencing one at a time of the elements 2, and then in a delivery to the conveyor 5.

The invention will now be explained with reference to the illustrated embodiments.

In particular, FIG. 1 illustrates a delivery device 1 that has a hopper 17 in the lower zone, in which the stopper elements 2, of cap type or the like, can be discharged in bulk.

The elements 2 are then entrained by a belt that is driven by an essentially vertical movement, to a predefined height. It is during this essentially vertical conveying that a first selection is carried out. The stopper elements 2 actually have a bottom opposite which there is an opening in such a way that they have a U-shaped cross-section to assume the shape of the spout to which they are affixed. The difference in weight between the open part and the closed part is used to carry out the sorting during the vertical conveying, more specifically by letting the elements 2 fall whose closed bottom is not against the belt.

The belt brings the stopper elements 2 to an exit zone 15, in the upper part. The elements 2 are then intended to be delivered to a piece of filling equipment, whose input is located at a certain height. For the purpose of reducing the energy consumed for the conveying of these elements 2, it is conceivable to use gravity and to thus allow the elements 2 to fall, within a suitable discharge spout from the exit zone up to the input of the downstream machine. This has the drawback of resulting in equipment that is sometimes very tall, which is then difficult to transport from the manufacturing site of the device to the worksite. In addition, the discharge spout between the exit zone and the zone for feeding the downstream machine is then located up high, and the entire intervention in the area of this discharge spout is then complicated.

By way of example, a conventional delivery device 1, although having to deliver correctly-oriented elements 2, is, of course, preferably to be equipped with a means for monitoring the actual orientation of the elements 2 that it delivers to the downstream machine, and this for preventing that a mistake in the sorting and/or orientation operation, even not very probable, does not create a major problem in the area of the downstream machine. This type of detection device is then placed in the discharge spout and is then at a height that is difficult to access. The intervention following a malfunction in this zone is then not very ergonomic, requiring intervention with ladders, etc.

In the embodiment that is illustrated in FIG. 1, the elements 2, once having passed through the exit zone 15, then circulate in a chute that makes it possible for gravity to entrain the elements 2. The discharge chute 6 extends essentially vertically, beside the belt. The elements 2 circulate there freely downward under the effect of gravity.

It should be noted here that the stream of elements 2 that pass through the exit zone 15 at the end of the belt is intermittent. It is therefore advantageous to arrange, in the lower part of the discharge chute 6, a zone for accumulating the elements 2, in such a way that a continuous stream of elements 2 can be organized downstream from this zone.

After this discharge chute 6, the delivery device 1 advantageously has a transfer wheel 11. The transfer wheel 11 makes it possible to ensure a reining-in of the elements 2 that, upstream, rest in contact with one another in the discharge chute 6. Actually, this transfer wheel 11 has peripheral openings 18 in which the successive elements 2 can be housed in such a way as to be entrained by said transfer wheel 11. The uniform distribution of openings 18 along the periphery of the transfer wheel 11 thus ensures that, at the output of the transfer wheel 11, the elements 2 are spaced uniformly from one another. Such a transfer wheel 11 makes it possible not only to separate the elements 2 in a predefined way but also to reference the successive elements 2, in such a way that their position is then known precisely, starting from the information of the angular position of the transfer wheel 11.

For this purpose, the transfer wheel 11 can be entrained by a synchronous motor. A transmission by a notched belt then makes it possible to synchronize the conveyor 5 and the wheel 11, then to prevent offsets and collisions between these two elements, in particular in the area of pins 16 for driving the conveyor 5 and protrusions that are complementary to the openings 18.

Advantageously, the speed of rotation of the transfer wheel 11, which consumes the elements 2 that fall into the discharge chute 6 and/or the speed of advance of the belt are regulated in such a way as to ensure an accumulation of elements 2 above the pick-up zone of the transfer wheel 11. This limits the jamming problems that can arise if an element 2 falls on the transfer wheel 11 that is already in motion. The transfer wheel 11 actually has peripheral extensions that are complementary to two successive openings 18, which can optionally lock an element 2 that arrives later in relation to the movement of the transfer wheel 11. A solution of regulation based on a detector in the area of the column of elements 2 arriving on the transfer wheel 11 is conceivable, as proposed in WO2012001251.

As has been pointed out, it is advantageous, for access questions, to prevent too tall a connection between the exit zone 15 and the downstream machine, in such a way that it is not possible to count on gravity to bring the elements 2 to the downstream machine. In these cases, the transfer wheel 11 can be motorized and can form a motor means for the column of element 2.

Figure 4:
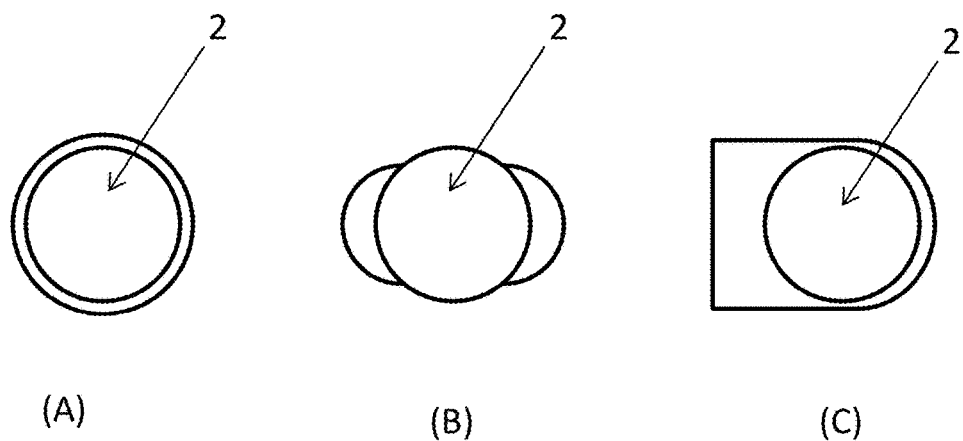
FIG. 4 shows possible stopper elements, seen from above.

This transfer wheel 11 can also ensure a function of orientation and/or selection of elements 2. Actually, in certain particular cases, the elements 2 are symmetrical in shape around an axis of rotation, as for cylindrical stoppers. In certain other cases, see FIG. 4, the elements 2 can be more elaborate and then have a non-symmetrical shape around an axis of rotation, for example with a rectangular base or with peripheral extensions. It is possible to provide that the transfer wheel 11 then ensures a function of positioning elements 2 according to a certain angle around their axis of symmetry corresponding to the spout. The transfer wheel 11 can also be used to select certain elements 2, on the basis of a poor orientation or a structural defect. WO2012001251 proposes, for example, conveying the elements 2 in the form of stoppers only in the case where their bottoms are located effectively on the expected side, and even also that their lower rings or collars are duly present.

It will be noted that the transfer wheel 11 is located at the bottom of the discharge chute 6, at a height that facilitates access thereto by an operator. A mistake in the execution of one of its functions above can therefore be quickly and easily processed by an operator without using lifting equipment, ladders, or the like.

The transfer wheel 11 thus works directly with the elements 2, individually, to ensure the functions described above, downstream from the belt, after a portion in which they move in an ungoverned manner under the effect of gravity in a discharge chute 6, within which they accumulate before being entrained by the transfer wheel 11. An opening 18 of the transfer wheel 11 is designed to accommodate an element 2 each time and has suitable dimensions.

The transfer wheel 11, which forms a means of referencing and/or conveying and/or orientation and/or selection and/or driving one at a time, is therefore downstream from a single-line conveying of elements 2. Downstream from the transfer wheel 11, it is necessary to arrange a lifting means, in particular in the cases where the driving energy of the wheel is inadequate. The delivery device 1 is thus provided with a conveyor 5 that can carry out the vertical lifting of each element 2 separately, and this to a predefined height.

In the particular case illustrated, this conveyor 5 takes the form of an endless belt or band, of which one of the sections ensures the vertical lifting of the elements 2. Successive housings are provided for each element 2 to be entrained. They are produced in the form of successive pins 16 along the band. An element 2 can then simply rest on a pin 16. Of course, the conveyor 5 then entrains the elements 2 in a channel with suitable dimensions in the other directions. The element 2 therefore rests continuously on a pin 16 and against the inside walls of a guide channel.

The conveyor 5 therefore circulates in an upward chute 7, which makes it possible to bring the elements 2 to the desired height. The path of the elements 2 therefore has a U shape, of which one branch would be formed by the discharge chute 6, upstream, and the other branch would be formed by the upward chute 7, downstream.

Figure 2:
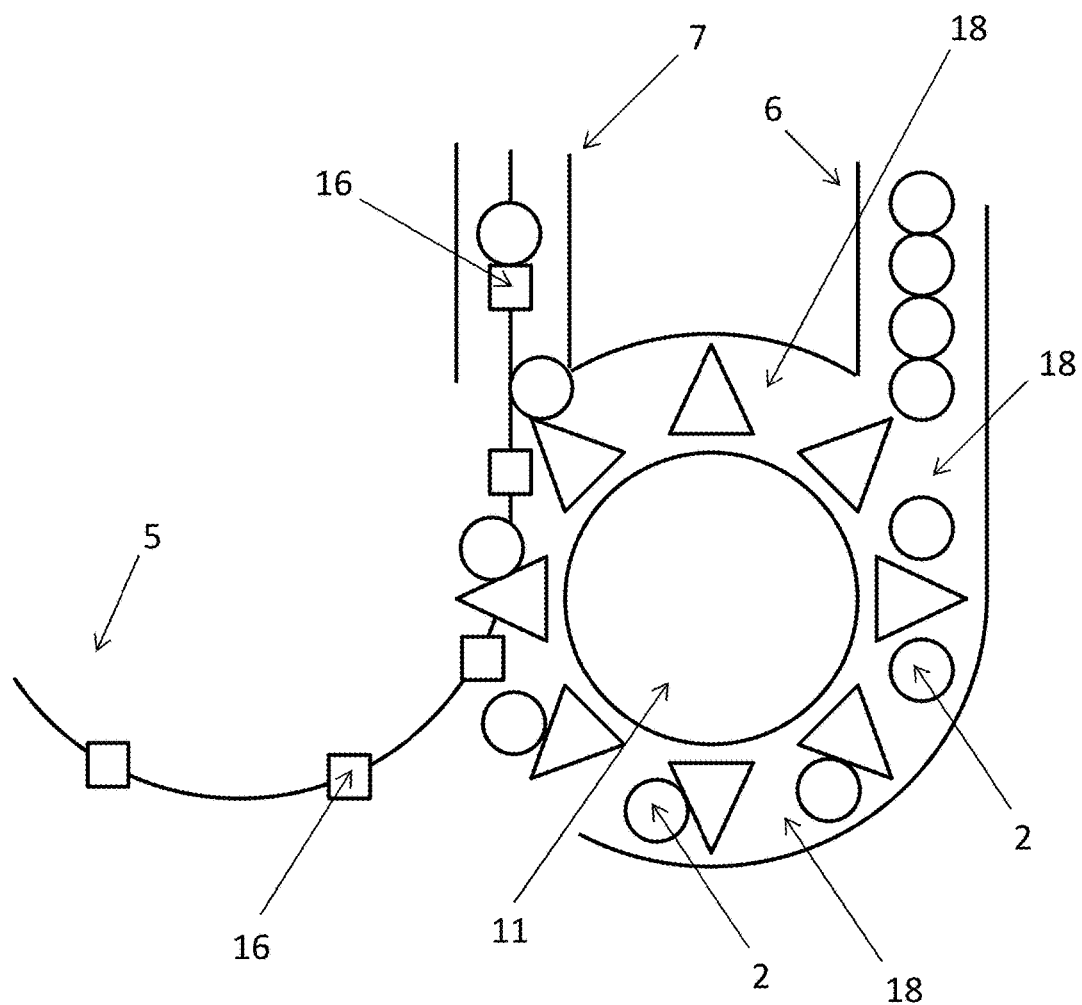
FIG. 2 illustrates the passage of an element of the transfer wheel toward the conveyor.

As FIG. 2 shows, the belt of the conveyor 5 is mounted on a reversing shaft in the lower part, with the active vertical strand of the belt being located more or less between, on the one hand, the reversing shaft, and, on the other hand, the transfer wheel 11. The transfer wheel 11 and the reversing shaft therefore rotate in this case in the reverse direction in relation to one another, like two meshed wheels. The delivery device 1 therefore has the series, starting from the belt, of the discharge chute 6, then the upward chute 7 of the conveyor 5, and then the return of the conveyor 5. In absolute terms, the return of the conveyor 5 could be located on the same side as the discharge chute 6 in relation to the upward chute 7, which would then require that the transfer wheel 11 and the reversing shaft rotate in the same direction.

There is thus obtained an overall structure where the delivery device 1 comes in the form of a first portion in which a vertical lifting belt ensures a first selection up to an exit zone 15, and then a second portion in which the elements are referenced and conveyed in a single-line fashion with a vertical U-shaped pathway, a transfer wheel 11 being located in the bottom of said U. The delivery device 1, except for optionally the upward chute 7 in certain applications, can therefore have a reduced height, i.e., essentially the one that is necessary to the belt to carry out its selection function, with the fact of reaching the height of the inlet of the next machine being ensured only by the conveyor 5. The transport of such a device is simplified to a large degree, and it can also not be dismounted between production and start-up for transport reasons.

The second portion is preferably beside the first and is in particular protected in a fairing from which optionally only a guide part of the elements 2 exits around the conveyor 5, after final monitoring and referencing, as will be described below.

It should be noted that the position of the conveyor 5 is monitored continuously, preferably owing to a driving element of the brushless-motor type, whose angular position is known at each moment. This monitoring of position makes it possible, thanks to the referencing of elements 2 on the conveyor 5, to know at any moment the position of each element 2 when it is picked up by the conveyor 5. In an analogous way, the angular position of the transfer wheel 11 is preferably known continuously, which also makes it possible to know at any moment the position of the referenced elements 2 on it. With the movement of the transfer wheel 11 and the conveyor 5 being coordinated, it is possible to know with precision the position of the element 2, on the conveyor 5, after it has left the transfer wheel 11. The coordination of the movements of the conveyor 5 and the transfer wheel 11 can be done electronically, with a monitoring unit that controls one and/or the other, or mechanically, with an assembly of two on the same driving in rotation, for example by engaged shafts, for example.

The conveyor 5 preferably forms the last portion of the delivery device 1 and can also, for example, extend up to the downstream machine, such as a sealing device, filler, or the like. The conveyor 5 can form the means for movement of the elements 2 in said machine, for at least its initial portion, and even for the entire machine. It is possible to synchronize the movement of the conveyor 5 with the operation of the downstream machine, for example.

As was already emphasized, the movement of the conveyor 5 is synchronized with that of the transfer wheel 11, so that an element 2 can pass from an opening 18 in which it is located in the area of the transfer wheel 11 to the space between two successive pins 16 in the area of the conveyor 5. The passage of one element 2 of the transfer wheel 11 to the conveyor 5 is done in the way described.

As FIG. 2 shows, the transfer wheel 11 has peripheral openings 18 that are each designed to contain an element 2. The transfer wheel 11 is nevertheless preferably less thick than the elements 2. The openings 18 follow one after another on the periphery of the transfer wheel 11 in such a way as to maintain a certain spacing between the elements 2. The successive elements 2 are pushed by the teeth that are complementary to the successive openings 18, within a circular channel in a form that is suited to the elements 2. So as to detach the elements 2 from the transfer wheel 11, the conveying device 1 at this location has a selective stop that prevents said elements 2 from continuing their journey with the transfer wheel 11. The shape of the teeth is, of course, adapted to avoid jamming the elements 2. The delivery device 1 therefore has, first of all, a conveying channel for accommodating both the transfer wheel 11 and the elements 2, and then, on the one hand, a restricted channel into which only the transfer wheel 11 can continue, and, on the other hand, a channel adapted to the elements 2 in which they can continue their progression into the upward chute 7.

The conveyor 5 and the transfer wheel 11 rotate in opposite directions, and the pins 16 therefore gradually come close to the transfer wheel 11 in the area of their junction. A pin 16 therefore arrives approximately after the tooth that entrains an element 2. When the element 2 arrives in the area of the selective stop zone that only the transfer wheel 11 can pass through, the element 2 is offset and detached from its tooth to then simply fall from an extremely short chute onto the pin 16 just below. It is then picked up by this pin 16 and can continue its movement under the action of the conveyor 5 and free an opening 18, which can be used to accommodate another element 2, see FIG. 2.

As FIG. 1 shows, the delivery device 1 has a visual analysis means 8 that is positioned downstream from the transfer wheel 11. As has been said, the transfer wheel 11 can ensure an operation of good positioning or selection of elements 2 on a criterion of orientation and/or shape. It is therefore useful to be able to verify the execution in particular of this function.

The visual analysis means 8 then consists essentially in a camera whose processing time is compatible with the desired flow of elements 2. Actually, it should be able to carry out a visual analysis of each element 2 in particular, since the elements 2 that arrive in its field of view are, at this time, conveyed referenced singly and spaced from one another.

The visual analysis means 8 can thus be used to detect the exact position of each element 2, but also, optionally, any defect therein owing to lack of material, for example.

It should be noted here that the elements 2 can in particular be stoppers or caps that then have a shape that is complementary to a cylindrical spout. The element 2 then has an at least local symmetry around an axis of symmetry, which generally corresponds to the axis of threading used to attach the element 2 to the container. The transfer wheel 11 is then preferably such that the elements 2 are moved with their axis of symmetry parallel to the axis of rotation of the transfer wheel 11. Consequently, the pins 16 for support and entraining by the conveyor 5 are then also preferably parallel to the element 2. The axis of observation of the visual analysis means 8 is then also parallel to the axis of symmetry of the elements 2. The guide in the upward chute 7 then provides a zone for circulation of the pins 16 that takes the form of a flat slot that is defined both by the axis of symmetry of the elements 2 and the direction of movement of the conveyor 5 at this location.

Owing to this orientation, it is possible with the visual analysis means 8 to detect a poor angular position of an element 2 around its axis of symmetry. It is also possible to detect, for example, material gaps, such as in the area of the bottom of an element 2 in stopper form.

Of course, it is also conceivable to arrange a guide portion around the conveyor 5 that is twisted around the direction of movement to bring the elements 2 into another orientation. For example, by arranging such a twisted portion at a right angle, the direction of observation of the visual analysis means 8 and the axis of symmetry of the elements 2 become perpendicular, and it is then possible to detect elements 2 whose thickness is not appropriate, thus denoting an absence of a lower ring, for example, etc. It is, of course, also possible to arrange a visual analysis means 8 that is able, using, for example, two perpendicular cameras, to detect the two separately.

The visual analysis means 8 therefore carries out an observation of the contours of the element 2 visually. The data generated are processed by a monitoring unit, which can, as described below, implement in a targeted way an ejection means 9 that is placed downstream.

Thus, the monitoring unit carries out a test for each element 2 and identifies its possible non-compliance. Since the exact position of each element 2 is known, thanks to the fact that the conveyor 5 conveys the elements 2 one by one, it is possible to know with precision at each moment the position of this defective element. It is then sufficient to arrange an ejection means 9 at a defined location, and to implement it as soon as an element 2, detected as being non-compliant, passes into its field of action. This then makes it possible to limit significantly the ejections of satisfactory elements 2 due to lack of precision, only because they are located close to a non-compliant element 2.

Since the visual analysis means 8 can identify the reason for the non-compliance, it is possible to eject the non-compliant element 2 based on the defect that it has. Thus, it is possible to envisage a number of ejection means 9: an ejection means 9 that sends back upstream the elements 2 that are intrinsically satisfactory but simply poorly-positioned and another ejection means 9 that finally ejects the elements 2 that are intrinsically non-compliant.

An effective way of producing an ejection means 9 is to provide for opening the guide of the elements 2 locally, by referencing in advance the elements 2 opposite, and then to act on the elements 2 to be detached in such a way as to draw them through the zone where the guide is eliminated. The elimination of at least one guide surface is necessary to be able to remove the non-compliant elements 2 from the guide channel. It is then necessary to prevent the satisfactory elements 2 from leaving the circuit in the area of this opening and therefore to ensure that only a monitored mechanical action brings the elements 2 into this opening. It is therefore useful, in the area of this opening, to ensure a systematic referencing of the elements 2 against a guide surface that is different from the one where the ejection opening is made.

Different ways of carrying out the referencing or the mechanical action are possible.

Figure 3:
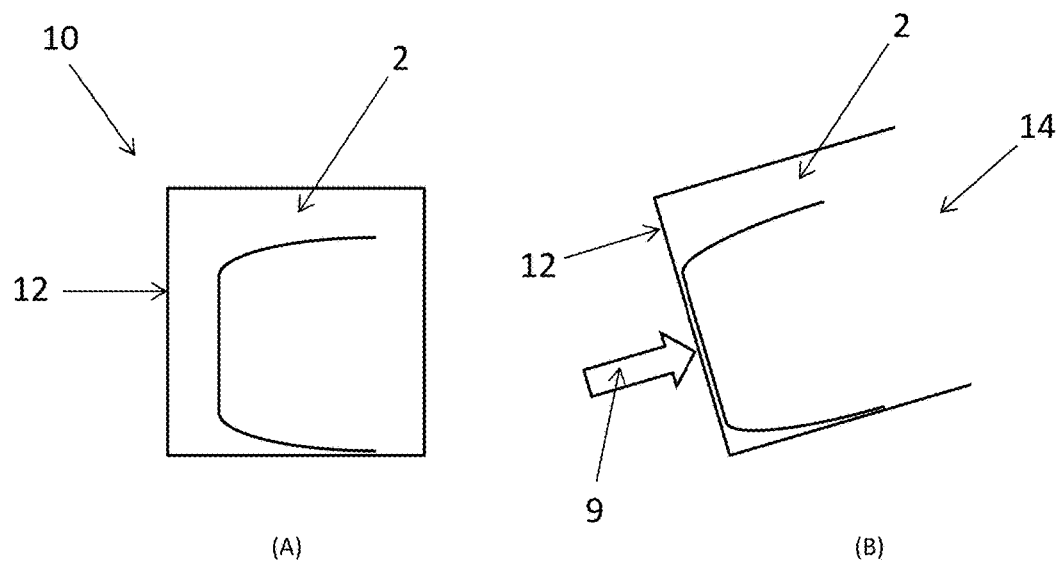
FIG. 3 shows two successive cross-sections where an exit passage can be arranged.

For example, as FIG. 3 shows, it is possible to use the distribution of the weight of an element 2 to ensure its position. It is thus possible to arrange a twisted section 13 so that the element 2 is positioned, under the effect of gravity, with its flat closed bottom against the reference surface 12. The section 13 then has quite simply a passage 14 opposite the reference surface 12.

The ejection means 9 can then comprise a retractable stop, controlled by the monitoring unit and that pushes the defective element 2 through the passage 14, when this is necessary.

FIG. 5 shows another possible embodiment. Downstream from the transfer wheel 11, the conveyor 5 moves in a centered fashion in relation to the guide surfaces of the elements 2. It thus exerts a mechanical driving force that is essentially aligned with the center of gravity of the element 2. This has the effect of allowing the element 2 to be positioned alternately against one or the other guide surface extending parallel to the conveyor 5. It is then possible to provide that in the area of a section 13, the conveyor 5 no longer moves in a centered fashion between the two guide surfaces opposite one another. The conveyor 5 then has a mechanical driving force on the element 2 that is deliberately offset from its center of gravity. The element 2 then is positioned systematically against the guide surface that is the farthest from the conveyor 5, which then becomes the reference surface 12. The guide channel within the section 13 therefore forms a type of baffle, which pushes the elements 2 against one of the two surfaces opposite. It is then sufficient to arrange the passage 14 at the front of the reference surface 12.

The ejection means 9 then comprises an actuator at the end of which there is a guide stop that changes the guide direction of the elements 2 and pushes them through the passage 14.

As has already been pointed out, the passage 14 can be an inlet opening of a return toward the feed hopper 17 or else a final drain.

Thanks to the invention, it thus is possible to obtain a delivery device 1 that is compact and reliable, whose parts that may require intervention are easy to access, whose flow rate is significantly high, and where the risk of delivering non-compliant stopper elements is reduced to a minimum.

Although the invention above is based on particular embodiments, it is in no way limiting of the scope of the invention, and modifications can be provided, in particular by substituting equivalent techniques or by a different combination of all or part of the characteristics developed above.

The invention claimed is:

1. A device for delivering sorted elements to feed a downstream work station, said device comprising:
   a lift in which a first sorting operation is performed;
   a processor mounted downstream of the lift that processes each of said elements individually, thereby determining and controlling a position of each of said elements; and
   a conveyor mounted downstream from the processor that directs the elements toward the work station, and that moves the elements one at a time,
   wherein the processor grasps each of the elements separately and brings each of the elements to the conveyor, and
   each element is entrained onto the conveyor separately.

2. The device according to claim 1, further comprising a discharge chute, between an exit of the lift and the processor, in which the elements fall by gravity and accumulate loosely.

3. The device according to claim 2, further comprising an upward chute, placed after the processor, and in which the conveyor circulates.

4. The device according to claim 2, further comprising both a visual analyzer for monitoring the appearance of the elements while they are transported by the conveyor downstream from the processor, as well as at least one ejector, acting downstream from the visual analyzer, for detaching the elements that are detected as being non-compliant.

5. The device according to claim 1, further comprising an upward chute, placed after the processor, and in which the conveyor circulates.

6. The device according to claim 1, further comprising:
   a visual analyzer that monitors an appearance of the elements while they are transported by the conveyor downstream from the processor, and
   at least one ejector, acting downstream from the visual analyzer, that detaches the elements that are detected as being non-compliant.

7. The device according to claim 6, further comprising a monitoring unit, receiving the signal from the visual analyzer as well as a signal that represents an advance of the conveyor and that controls the maneuvering of at least one ejector.

8. The device according to claim 1, wherein
   the processor comprises a driving transfer wheel, individually entraining the elements on its periphery.

9. The device according to claim 8, wherein
   the conveyor and the transfer wheel work in a synchronized way to make it possible for each element separately to pass from the transfer wheel to the conveyor.

10. The device according to claim 1, further comprising a referencing element that ensures the placing of elements against a reference surface during their conveying by the conveyor within a predefined section of the delivery device, with said section having an open part without a passage-forming guide opposite the reference surface, with the ejector acting in such a way as to direct the elements toward this open part to detach them from the conveyor.

11. The device according to claim 10, wherein
   the referencing element, essentially consists of a channel for guiding elements that is twisted in such a way as to ensure that, under the effect of gravity, each element is flattened and circulates against the bottom of said channel that then forms the reference surface.

12. The device according to claim 10, wherein
   the referencing element essentially consists of a channel for guiding elements that is offset in relation to the direction of the conveyor, in such a way that the conveyor exerts on the element a force that does not pass through its center of gravity and that thus has the effect of pushing it laterally toward one of the side surfaces of said channel that then forms the reference surface.

13. The device according to claim 10, wherein the referencing element is located downstream of the processor.

14. A method for delivery of stopper elements, the method comprising:
   carrying out a first selection of elements within a lift,
   bringing the elements toward a processor in a single-line column,
   processing the elements one at a time within the processor,
   monitoring and controlling a position of each of the elements, the method further comprising, following the processing one at a time, an output conveying step toward the downstream work station, during which each element is entrained separately.

15. The method d according to claim 14, further comprising
monitoring an appearance of each element during the output conveying, in particular using a stationary camera in the field of view from which the elements circulate, and
automatically detaching the elements that are detected as non-compliant on the basis of the monitoring of appearance.

16. The method according to claim 15, wherein
monitoring of the appearance comprises verifying the position of the element in such a way as to be able to detect a poor orientation and/or verifying its dimensions, and/or verifying that the element is complete.

17. The method according to claim 14, wherein
bringing the elements into a single-line column is done by allowing gravity to act, with the elements circulating within a discharge chute that ends in the processor that processes the elements one at a time, and within which they accumulate.

18. The method according to claim 14, wherein
processing the elements one at a time essentially consists in grasping each one of them separately from the discharge chute to bring them into an upward chute and/or to modify the orientation thereof and/or to detach the non-compliant elements.

\* \* \* \* \*